United States Patent [19]

Wittke

[11] 4,159,419

[45] Jun. 26, 1979

[54] THREE AXIS STELLAR SENSOR

[75] Inventor: Ernest C. Wittke, West Caldwell, N.J.

[73] Assignee: The Singer Company, Little Falls, N.J.

[21] Appl. No.: 829,406

[22] Filed: Aug. 31, 1977

[51] Int. Cl.$^2$ .......... G01J 1/20

[52] U.S. Cl. .......... 250/203 R; 356/152; 356/255

[58] Field of Search .......... 244/3.18; 250/203 R, 250/203 CT; 356/141, 152, 255

[56] References Cited

U.S. PATENT DOCUMENTS

| | | | |
|---|---|---|---|
| 3,263,944 | 8/1966 | Watson | 244/3.18 |
| 3,483,384 | 12/1969 | Pinson | 244/3.18 X |
| 3,992,106 | 11/1976 | Auerbach | 356/141 |

*Primary Examiner*—Lawrence J. Dahl
*Attorney, Agent, or Firm*—Laurence A. Wright; Thomas W. Kennedy

[57] ABSTRACT

A three-axis stellar sensor comprising a conventional stellar sensor for detecting the presence of light from a radiant body. The stellar sensor is mounted on a stable member located in a vehicle. The axis of the telescope of the sensor is parallel to a first line of sight to a first radiant body and a silvered mirror located at an angle of 45° to the axis of the telescope provides a means to measure light from a second radiant body along a second line of sight 90° displaced from the first line of sight. Additional means are provided to rotate and measure the mirror angle.

10 Claims, 8 Drawing Figures

FIG. 1
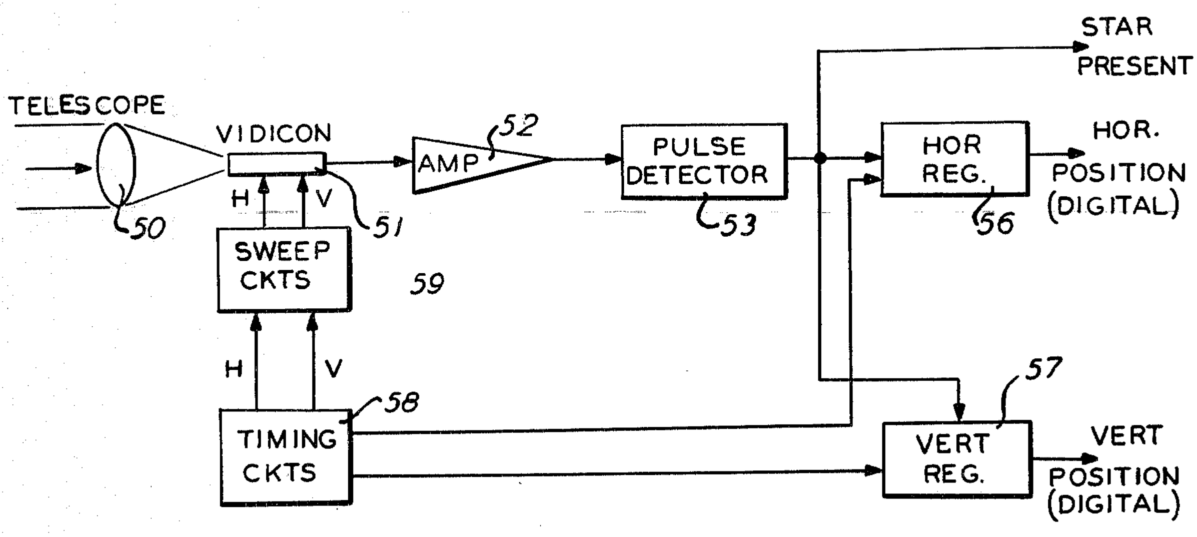
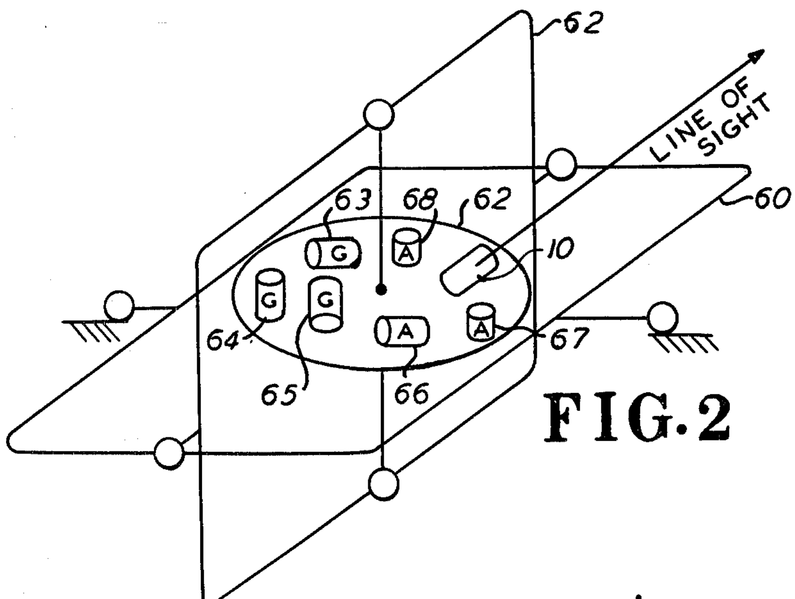
FIG. 2
FIG. 4
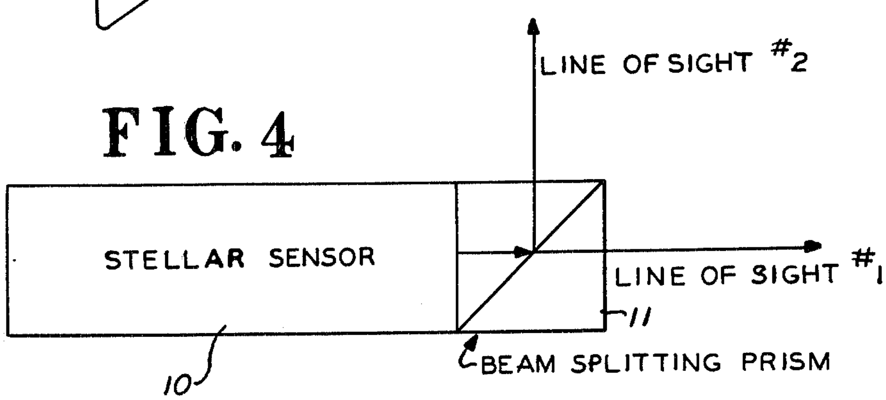

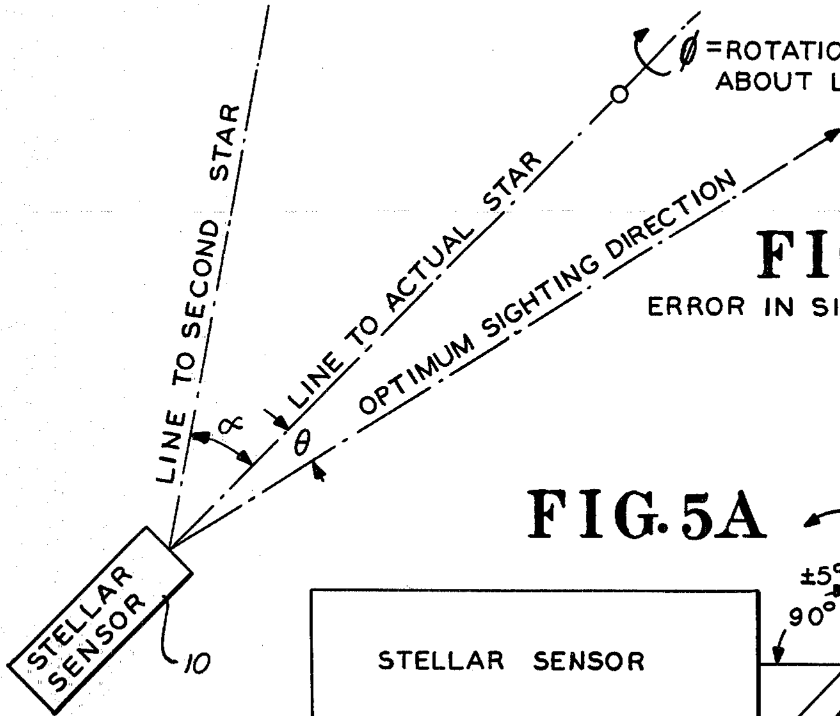
FIG. 3
ERROR IN SIGHTING = $\phi$ SIN $\theta$
FIG. 5A
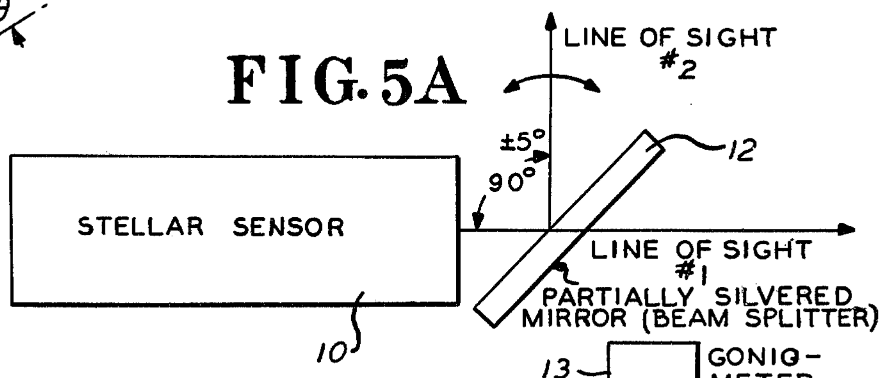
FIG. 5B
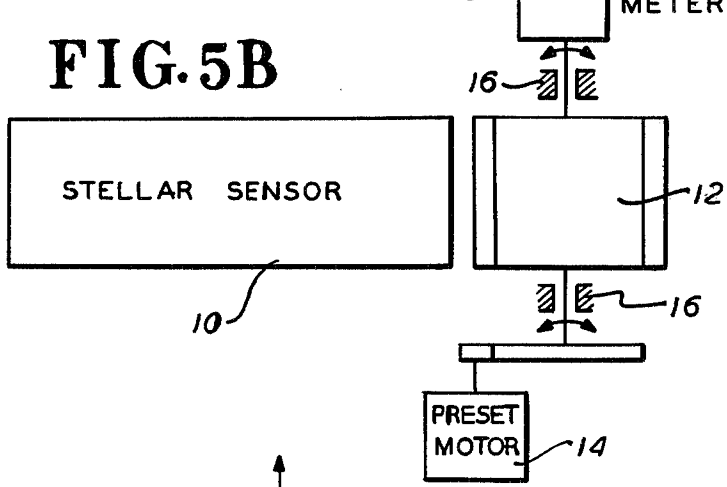
FIG. 6A
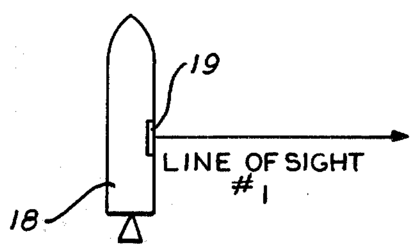
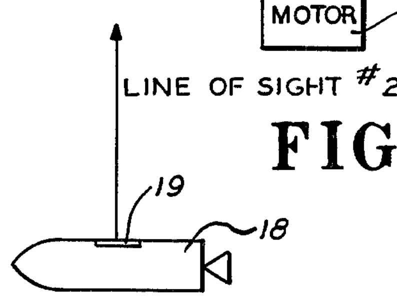
FIG. 6B

THREE AXIS STELLAR SENSOR

The Government has rights in this invention pursuant to Contract No. N00030-76-C-0070 awarded by the Department of the Navy.

PRIOR ART

U.S. Pat. No. 3,342,795; J. V. Hughes; Mar. 29, 1966.

CO-PENDING APPLICATIONS

U.S. Patent Application Ser. No. 748,989 filed Dec. 9, 1976;

U.S. Patent Application Ser. No. 752,496 filed Dec. 20, 1976;

U.S. Patent Application Ser. No. 756,517 filed Jan. 3, 1976.

This invention is related to inertial navigation devices. More particularly, this invention is related to a star tracker which provides an accurate, arbitrarily chosen, direction in a vehicle operating outside of the atmosphere.

BACKGROUND OF THE INVENTION

In prior art inertial navigational systems employing a star tracker, the requirements of determining an accurate, arbitrarily chosen direction is accomplished by (1) either the line of sight is gimballed with respect to the stable element of an inertial system, or (2) the tracker is rigidly mounted to the stable element. A star is chosen which is located as close as possible to the desired direction and the stable element is initially aligned sufficiently close to the star direction to cause the star to be within the star tracker field of view.

The first approach is capable of sensing to an arbitrarily chosen direction as required by sighting successively on two stars and determining the orientation of the stable member in these axes. It has the disadvantage of requiring the precise measurement of large line of sight displacements in two axes. Where high accuracies are required, the error in the tracker gimbal bearings and angle measurement preclude such an approach. The second approach, since the tracker is mounted to the stable member, is highly accurate providing a suitable star is located in the desired direction. Where a star is not so conveniently positioned, significant errors are introduced, and in general, overall accuracy is limited.

The present invention is designed to obtain the arbitrary direction capability of the gimballed type of tracker combined with the optimum star position accuracy of the fixed stable member. This is accomplished along a preferred axis to an accuracy previously attainable only along an axis which points directly at a star, and to a modestly degraded accuracy in other directions. This is to be compared with previously known means which require an independent two-axis gimballing of the star tracker with respect to the inertially stable member and are subject to the errors in the angle measuring devices, or which require precessing of the platform through relatively large angles and are consequently subject to large gyro torquing errors.

BRIEF DESCRIPTION OF THE INVENTION

The present invention comprises a conventional stellar sensor having a telescope, stellar light sensor mounted on a stable platform of a gyroscope. In addition, the present invention incorporates in the star tracker a partially silvered mirror located at a nominal 45° to the line of sight so as to deflect the lines of sight of the tracker by approximately 90°. This arrangement allows the stable member mounted tracker to operate along its original line of sight without additional error and also along a line of sight located at approximately 90° to the original line of sight.

Accordingly, it is an object of this invention to provide a three axis stellar sensor to provide an accurate, arbitrarily chosen direction in a vehicle operating outside of the atmosphere.

These and other objects, features and advantages of the present invention will become apparent from the following description taken in conjunction with the accompanying drawings wherein:

FIG. 1 is a schematic block diagram of a star tracker suitable for use with the present invention;

FIG. 2 shows the telescope of the invention mounted on the inner gimbal of an inertial platform;

FIG. 3 is a schematic diagram which illustrates the difficulty of determining the star angle in space;

FIG. 4 shows the stellar sensor of FIG. 3 with the addition of a beam splitter;

FIGS. 5*a* and 5*b* are top plan and side elevational views, respectively, of the stellar sensor of the invention with a partially silvered mirror located at a nominal 45° to the line of sight of the stellar sensor; and FIGS. 6*a* and 6*b* show a vehicle in which the stellar sensor is mounted and also the orientation of the vehicle in determining the star angle.

Referring to FIG. 1, there is shown a video star tracker suitable for use with the teaching of the invention. Radiant energy from a distant source is focused by the lens 50 of the telescope onto Vidicon, or solid state sensor, 51. As is well known in the art, the sensor 51 measures any linear displacement of the image from a nominal position on its surface. The signal sensed represents an angular displacement line of sight of the telescope from the star at which the telescope is directed and the sensor provides error signals to the amplifier 52. These signals are detected in pulse detector 53, which provides at its output a signal representing the star position. The output from pulse detector 53 is also provided to inputs of horizontal register 56 and vertical register 57. The outputs from registers 56 and 57 are digital horizontal position and digital vertical position of the star respectively. Timing circuits 58 drive sweep circuits 59 as well as horizontal register 56 and vertical register 57. Sweep circuit 59 in turn provides horizontal and vertical signals to Vidicon 51.

Turning briefly to FIG. 2, there is shown the platform system upon which the telescope 10 is mounted. It is seen that the platform comprises an outer gimbal 60, middle gimbal 61 and inner gimbal 62. Mounted on the inner gimbal are three gyros, 63, 64, 65, one for each of the three mutually perpendicular axes and three accelerometers, 66, 67, 68, also representing the three mutually perpendicular axes. The line of sight of telescope 10 is parallel to the axis of outer gimbal 61.

Referring to FIG. 3, there is shown in schematic form stellar sensor 10 which illustrates the difficulty in determining the direction of the desired line in space. This direction can be defined by a coordinate system having one axis coincident with the optimum sighting direction. What is required, is the angular orientation in space of a plane perpendicular to this direction. The best that can be achieved by a single star sighting is the orientation of a plane perpendicular to the line of sight to a star. Since, in general, the line of sight to a star will not coincide with the optimum sighting direction, by an angle $\theta$, it is necessary to have a priori knowledge of the angular position of a plane containing the line of sight to the star and the optimum line of sight. Since this plane is perpendicular to the star tracker plane, what is required is knowledge of rotation, $\phi$, about the line of sight. The error in determining the optimum line of sight direction is $\phi$ sine $\phi$. If another sighting can be taken to the original star, the rotation of the star tracker coordinate system about its line of sight can be determined to an accuracy proportional to the cosecant of the angle $\alpha$ of FIG. 3. For a system having identical accuracies for both sightings, if the angle $\alpha$ is greater than the angle $\theta$, the error in the determination of the optimum direction is essentially equivalent to the error in an ideally oriented sighting.

Referring to FIGS. 3 and 4, since the arbitrary redirection of the line of sight through a gimballing system will itself introduce errors, it would be ideal if the line of sight could be redirected by a beam splitting prism 11 through the required angle $\alpha$ to eliminate any error due to mechanical motions, allowing either star to be sighted by operation of a shutter or movement of a window. Such an arrangement would not induce uncertainties in the line of sight, since the prism would induce fixed offset errors in the lines of sight which are subject to calibration. The prism 11 will have the effect of reducing the light from the star and background for each of the sighting directions to about 40% of the level occurring in the original design. However, a modern star tracker is background rather than signal limited and requires aperture size to only meet resolution requirements. Providing a shutter is closed in the unused direction, the signal to noise ratio of the star signal in the active direction will not change in the used direction.

With the arrangement shown in FIG. 4, the initial alignment of the stable member containing the telescope and the inertial sensors can be chosen, as line of sight #1, to a star which is as close as possible to the preferred direction. The other degree of freedom for platform alignment (rotation about line of sight #1) can be chosen so as to be directed to a star which is located 90° from the star represented by line of sight #1, providing maximum possible accuracy in the determination of the angle $\phi$.

Turning now to FIGS. 5*a* and 5*b*, the deficiency in the preceeding mechanization is the fact that it will not be possible in most cases to find a second usable (i.e., bright enough and not affected by the proximity of Sun, Moon, or Earth) star close enough to 90° from the first star to fall within the tracker field of view. It is necessary, therefore, to provide a small degree of adjustment in the 90° angle. There exists somewhat more than 10 usable stars per steradian of sky. If one assumes that the usable stars are randomly distributed, the probability that at least one usable star will not occur in any randomly chosen steradian of sky is virtually nil. At 90° from the axis of rotation (line of sight #1), a band 9.2° wide has an area of 1 steradian. If the angle between lines of sight 1 and 2 can be adjusted by ±5°, a satisfactory candidate for star #2 is assured. Actually, a smaller adjustment would be probably satisfactory. Adjustment of the nominal 90° angles by ±5° is achievable by substituting a partially silvered plane mirror 12 for the prism 11. Mirror 12 having nominally parallel surfaces will not affect the focus or direction of line of sight #1. The effect of any lack of parallelism between the surfaces can be corrected as a function of rotation angle of the mirror, since the coupling between error and angle will be small. Mirror 12 is supported on bearings 16 which allow rotation of the mirror about an axis which is perpendicular to both lines of sight. The limited rotation (±2.5°) of the mirror allows use of flex pivot bearings (e.g., those manufactured by Bendix Corp.) and eliminates all play in the bearings. It should be noted that mirror 12 will not affect the accuracy of line of sight #1. Mirror 12 is rotated to cause line of sight #2 to be at an angle to line of sight #1 equal to the angle between the two usable stars (nominally 90°), by means of preset motor drive 14 and angle measuring device 13. Since no data is to be taken in the axis of the mirror rotation, the accuracy of mirror rotation measurement can be low. A standard synchro would be suitable. The high accuracy data is a measurement of the direction of an axis normal to the bearing axis and to line of sight #1.

Referring to FIGS. 6*a* and 6*b*, in use in a vehicle 18 the stable member would be initially aligned so as to have the telescope axis pointed to a usable star (#1) as close as possible to the preferred direction of sighting, and to have a plane perpendicular to the mirror bearing axis contain, as close as possible, a usable star nearly 90° from line of sight #1 (FIG. 6*a*). All navigation data would be referred to this position. The mirror would then be rotated so as to bring binary star #2 as close as possible to the center of the tracker field of view. The term "as close as possible" refers to the systems' a priori knowledge of its angular orientation in stellar space. At the time of sighting, vehicle 18 would be rotated (it is assumed to be in free fall out of the atmosphere) to cause a window located in the platform case, and matching by window 19 of the vehicle to coincide with line of sight #1. Once a reading had been taken of the error in a priori assumption of line of sight #1, vehicle 18 and hence the platform case would be rotated so as to bring the windows into coincidence with line of sight #2. This allows a measurement of the initial error in the a priori assumption of the rotation of the system about line of sight #1. Once the system has a measurement of these errors in its a priori direction assumption, it can then compute the true location of the optimum sighting direction.

The accuracy improvement resulting from the addition of a second sighting axis which is itself free from gimbal angle measurement errors is considerable. In the limit, it must be assumed that the a priori knowledge of direction may be in error by one-half of the field of view of the telescope. This error propagates into the determination of the optimum sighting direction in proportion to the sine of the offset of view and at a 5° offset angle would be 3 arc minutes. The error in the present invention is limited only by the integrity of the basic tracker-inertial sensor combination and can be made quite small.

From the foregoing, a star tracker has been disclosed with a sensor rigidly mounted to the stable platform containing the inertial sensors of a vehicle in free fall (space) to determine all three spatial axes from desired star sensing. Although only preferred embodiments of the present invention have been described herein, it is not intended that the invention be restricted thereto, but it be limited only by the true spirit and scope of the appended claims.

What is claimed is:

1. A three axis star tracker comprising:

a telescope said telescope having its axis lying in a plane parallel to a line of sight to a first radiant body, means having a second line of sight to a second radiant body and displaced 90° from said first line of sight, means for detecting the light from said first and second radiant bodies along their lines of sight, and means for measuring the errors along said first and second lines of sight and for computing the true location of the optimum sighting direction.

2. The star tracker of claim 1 wherein said means having a second line of sight comprises:

a beam splitter positioned to intersect the axis of said telescope at an angle of 45°.

3. The star tracker of claim 1 wherein said means having a second line of sight comprises:

a partially silvered mirror positioned to intersect the axis of said telescope at an angle of 45° said mirror having limited adjustment about an axis perpendicular to said first and second lines of sight so that radial light is intersected within a steradian of randomly positioned radiant bodies.

4. The star tracker of claim 3 comprising:

means for driving said mirror within its adjustable range, and means for permitting rotation of said mirror about its adjustable range.

5. The star tracker of claim 4 comprising:

means for measuring the angle of rotation of said mirror, flex pivot bearings permitting rotation of said mirror, and a preset motor connected to said mirror for driving said mirror into rotation.

6. The star tracker of claim 5 comprising:

a stable member, a vehicle supporting said stable member therein said vehicle having a window aligned with a window of said telescope, and means for rotating said vehicle so that said telescope and said vehicle are oriented to said first radiant body along said first line of sight and thence oriented to said second radiant body along said second line of sight, whereby said star tracker measures the errors along said first and second lines of sight and computes the true location of the optimum sighting direction.

7. An optical sensor for determining the positions to radiant bodies comprising:

a stable member, a vehicle having said stable member mounted therein, a telescope having its axis lying in a plane parallel to a line of sight of a first radiant body mounted on said stable member said telescope having a window aligned with a window of said vehicle, means having a second line of sight displaced 90° from said first line of sight to a second radiant body, and means for measuring the errors along said first line of sight and for computing the true location of the optimum sighting direction.

8. The optical sensor of claim 7 wherein said means having a second line of sight comprises:

a beam splitter positioned to intersect the axis of said telescope at an angle of 45°.

9. The optical sensor of claim 7 wherein said means having a second line of sight comprises:

a partially silvered mirror having parallel sides positioned to intersect the axis of said telescope at an angle of 45° said mirror passing light unobstructed to said first line of sight and being adjustable about an axis perpendicular to both first and second lines of sight.

10. An optical sensor for determining the position of a radiant body comprising:

a vehicle having said optical sensor mounted therein said vehicle also having a window, a stable member mounted in said vehicle, a telescope mounted on said stable member said telescope having means for detecting the presence of light from a first radiant body along its axis parallel to a first line of sight, a partially silvered mirror located to intersect the axis of said telescope at an angle of 45° said mirror detecting a second radiant body along a second line of sight displaced 90° from said first line of sight said mirror being adjustable for rotation about an axis perpendicular to said first and second lines of sight, flex pivot bearings permitting rotation of said mirror about its axis, a preset motor connected to said mirror for driving said mirror into rotation, means for measuring the angle of rotation of said mirror, and means for comparing the errors along said first and second lines of sight and for computing the true location of the optimum sighting direction.

* * * * *